(12) United States Patent
Reed et al.

(10) Patent No.: US 11,601,321 B2
(45) Date of Patent: Mar. 7, 2023

(54) DATA CENTER MANAGEMENT OVER A POWER PLANE

(71) Applicant: LENOVO ENTERPRISE SOLUTIONS (SINGAPORE) PTE. LTD., Singapore (SG)

(72) Inventors: Connor B. Reed, Durham, NC (US); Christopher L. Wood, Chapel Hill, NC (US); Keith M. Campbell, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 188 days.

(21) Appl. No.: 16/916,608

(22) Filed: Jun. 30, 2020

(65) Prior Publication Data

US 2021/0409258 A1  Dec. 30, 2021

(51) Int. Cl.
*H04L 41/04* (2022.01)
*H04B 3/54* (2006.01)
*H04L 9/40* (2022.01)

(52) U.S. Cl.
CPC ............. *H04L 41/04* (2013.01); *H04B 3/542* (2013.01); *H04L 63/0428* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 2002/0080575 A1* | 6/2002 | Nam | H05K 7/20727 361/679.48 |
| 2006/0230165 A1* | 10/2006 | Zimmer | G06F 9/4405 709/230 |
| 2020/0059458 A1* | 2/2020 | Abraham | H04L 41/0803 |

OTHER PUBLICATIONS

Unknown, "Are powerline Ethernet adapters inherently secure?", Information Security, dated Dec. 2011, retrieved Dec. 12, 2019, 1 page, URL: https://security.stackexchange.com/questions/9725/are-powerline-ethernet-adapters-inherently-secure.

\* cited by examiner

*Primary Examiner* — Brandon Hoffman (57) ABSTRACT

Data center management over a power plane, including: coupling, via a plurality of power planes, a management hub to one or more servers; and transferring, via the plurality of power planes, data between the management hub and the one or more servers.

20 Claims, 6 Drawing Sheets

DATA CENTER MANAGEMENT OVER A POWER PLANE

BACKGROUND

Field of the Invention

The field of the invention is data processing, or, more specifically, methods, apparatus, and products for data center management over a power plane.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Data center management over a plurality of power planes, including: coupling, via a plurality of power planes, a management hub to one or more servers; and transferring, via the plurality of power planes, data between the management hub and the one or more servers.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
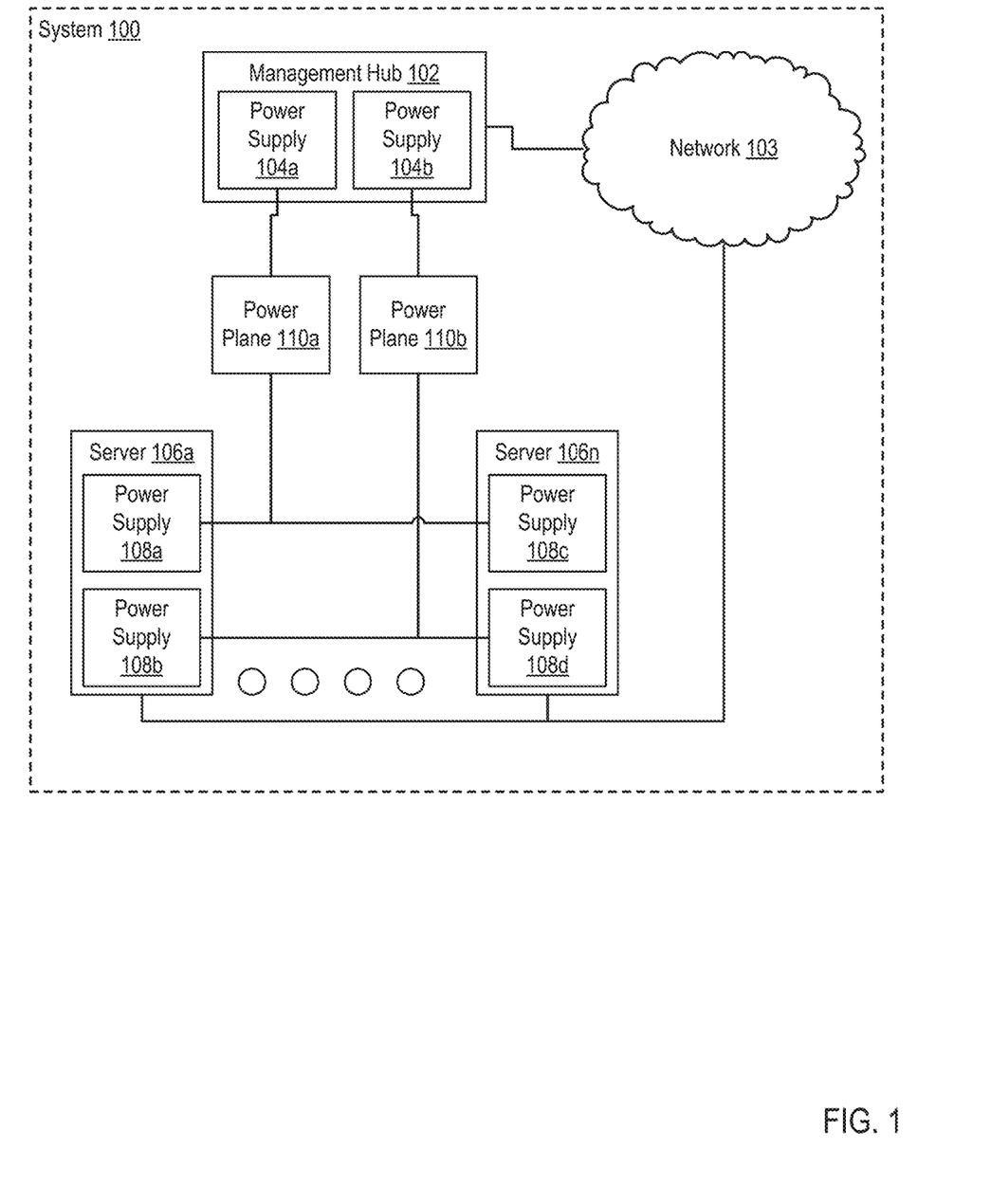
FIG. 1 is a block diagram of an example system for data center management over a power plane according to some embodiments of the present disclosure.

Exemplary methods, apparatus, and products for data center management over a power plane in accordance with the present invention are described with reference to the accompanying drawings, beginning with FIG. 1. FIG. 1 sets forth a block diagram of an example system 100 for data center management over a power plane according to embodiments of the present invention. The system 100 may comprise a same rack of components, or a grouping of components in a same data center. The system 100 of FIG. 1 includes a management hub 102. The management hub 102 is a computing device or combination of computing devices configured to perform various management tasks with respect to one or more servers 106a-n in the system 100. For example, the management hub 102 may direct Keyboard Video Mouse (KVM) traffic between one or more servers 106a-n and the management hub 102 to allow input devices (e.g., keyboards and mice) connected to the management hub 102 to interact with a server 106a-n, and allow video data from the one or more servers 106a-n to be displayed on a display device connected to the management hub 102. The management hub 102 may also receive data from Baseboard Management Controllers (BMCs) of the servers 106a-n (e.g., BMC traffic) and modify various configurations of the servers 106a-n based on the BMC traffic. The management hub 102 may also perform additional management tasks for the servers 106a-n as can be appreciated. The management hub 102 is communicatively coupled to the servers 106a-n via a network 103. The network 103 may include a local area network (LAN) such as an Ethernet network or other wired network. The network 103 may also include a wireless network such as a WiFi network.

The management hub 102 also includes one or more power supplies 104a/b. Each server 106a-n also includes one or more power supplies 108a/b and 108c/d, respectively. Although the management hub 102 and servers 106a-n are shown each with two power supplies, it is understood that the management hub 102 and servers 106a-n may also have a single power supply, or additional power supplies. The management hub 102 is coupled to the servers 106a-n via one or more power planes 110a/b. A power plane 110a/b is a combination of components (e.g., power distribution units, power cables, etc.) to provide power from an external power source to the power supplies of connected components. In this example system 100, each power supply 104a/b of the management hub 102 is coupled to a different power plane 110a/b. Additionally, each power supply 108a/b or power supply 108c/d for a given server 106a-n is coupled to a different power plane 110a/b. Thus, each power plane 110a/b provides a redundant link between the management hub 102 and servers 106a-n. For example, if a connection in the power plane 110a fails or is severed, the management hub 102 is still communicatively coupled to each server 106a-n using the power plane 110b.

Although the example system 100 is shown as having two power planes 110a/b coupling the management hub 102 and servers 106a-n, it is understood that fewer or more power planes 110/b may be used to couple the management hub 102 and servers 106a-n. For example, the management hub 102 and servers 106a-n may be coupled using a number of power planes equal to a number of power supplies in the management hub 102 and servers 106a-n. Using this example, where the management hub 102 and servers 106a-n each have one power supply, the management hub 102 and servers 106a-n would be connected using a single power plane. Where the management hub 102 and servers 106a-n each have four power supplies, the management hub 102 and servers 106a-n would be connected using four power planes providing four redundant links, etc.

The management hub 102 can then transfer, via a power plane (e.g., the power plane 110a and/or the power plane 110b), data between the management hub 102 and the servers 106a-n. The data transferred between the management hub 102 and the servers 106a-n may comprise management data typically sent through out-of-band channels. For example, the data may comprise KVM traffic, BMC traffic, or other out-of-band management data as can be appreciated. Accordingly, the management hub 102 may determine whether to send the data via the power plane 110a/b or another network (e.g., the network 103). Determining to send the data via the power plane 110a/b may be based on a type of data. For example, out-of-band management data may be determined to be sent via the power plane 110a/b, whereas other in-band data may be determined to be sent via the network 103. Determining to send the data via the power plane 110a/b may be based on a data size or required bandwidth. For example, data falling below a size or bandwidth threshold may be determined to be sent via the power plane 110a/b while data meeting or exceeding the threshold may be determined to be sent via the network 103. Other criteria may also be used in determining whether to send the data via the power plane 110a/b or the network 103.

Existing solutions for transferring data (e.g., out-of-band management data) between the management hub 102 and servers 106a-n require dedicated cabling and devices (e.g., serial ports), adding cost to racking servers 106a-n, reducing airflow, and increasing the complexity of cable management. In contrast, data center management over a power plane allows for reduced cable requirement and complexity by using the existing power planes. Moreover, the use of multiple power planes (e.g., power planes 110a/b) allows for redundant connections to increase data transfer reliability. Furthermore, unlike existing solutions for transferring data over power cabling such as the X10 protocol and Ethernet Over Power, data center management over a power plane as described herein allows for authentication and authorization of connected servers 106a-n. Thus, unauthorized devices cannot be connected to the network provided by the power planes.

For example, in response to being coupled to the management hub 102 via a power plane 110a/b, a server 106a sends a certificate to the management hub 102. For example, each power supply 108a/b of a server 106a may correspond to a different certificate. The certificate for each power supply 108a/b may be defined by a user or client input to the server 106a. The management hub 102 receives the certificate via the power plane 110a/b and authenticates the server 106a based on the certificate. The management hub 102 can then encrypt data for transmission to the server 106a using the certificate. For example, the management hub 102 can encrypt the data using a certificate corresponding to which power supply 108a/b will be used to receive the data (e.g., which power plane 110a/b will be used to transmit the data).

Data center management over a power plane in accordance with the present invention is generally implemented with computers, that is, with automated computing machinery. For further explanation, therefore, FIG. 2 sets forth a block diagram of automated computing machinery comprising an exemplary management hub 102 configured for data center management over a power plane according to embodiments of the present invention. The management hub 102 of FIG. 2 includes at least one computer processor 202 or 'CPU' as well as random access memory 204 (RAM') which is connected through a high speed memory bus 206 and bus adapter 208 to processor 202 and to other components of the management hub 102.

Figure 2:
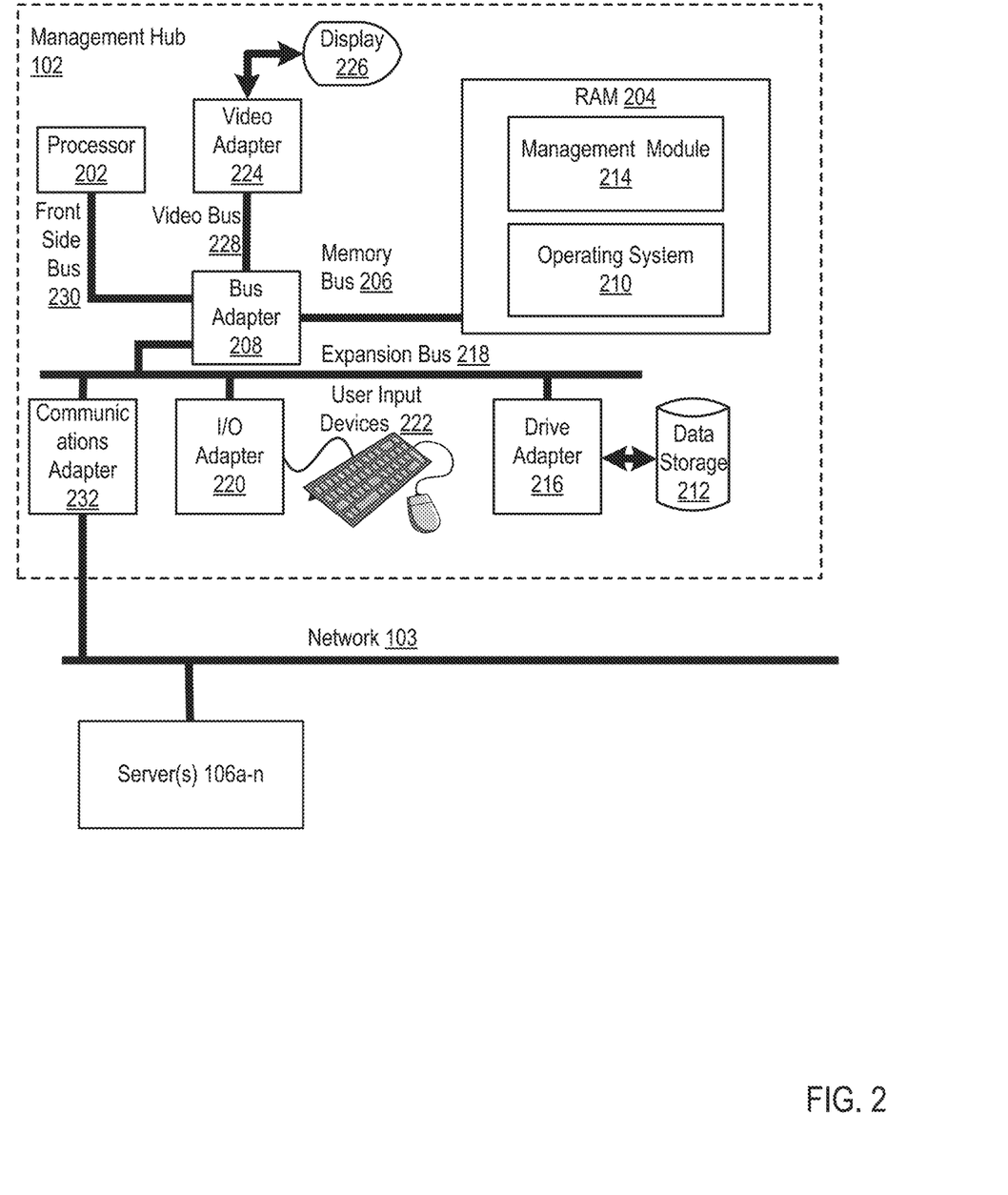
FIG. 2 is a block diagram of an example computing device for data center management over a power plane according to some embodiments of the present disclosure.

Stored in RAM 204 is an operating system 210. Operating systems useful in computers configured for data center management over a power plane according to embodiments of the present invention include UNIX™, Linux™, Microsoft Windows™, AIX™, IBM's i OS™, and others as will occur to those of skill in the art. The operating system 208 in the example of FIG. 2 is shown in RAM 204, but many components of such software typically are stored in non-volatile memory also, such as, for example, on data storage 212, such as a disk drive. Also stored in RAM is the management module 214 a module for data center management over a power plane according to embodiments of the present invention.

The management hub 102 of FIG. 2 includes disk drive adapter 216 coupled through expansion bus 218 and bus adapter 208 to processor 202 and other components of the management hub 102. Disk drive adapter 216 connects non-volatile data storage to the management hub 102 in the form of data storage 212. Disk drive adapters useful in computers configured for data center management over a power plane according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example management hub 102 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example management hub 102 of FIG. 2 includes a video adapter 224, which is an example of an I/O adapter specially designed for graphic output to a display device 226 such as a display screen or computer monitor. Video adapter 224 is connected to processor 202 through a high speed video bus 228, bus adapter 208, and the front side bus 230, which is also a high speed bus.

The exemplary management hub 102 of FIG. 2 includes a communications adapter 232 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for data center management over a power plane according to embodiments of the present invention include modems for wired dial-up communications, Ethernet (IEEE 802.3) adapters for wired data communications, and 802.11 adapters for wireless data communications.

The communications adapter 232 is communicatively coupled to a network 103 that also includes one or more servers 106a-n.

Figure 3:
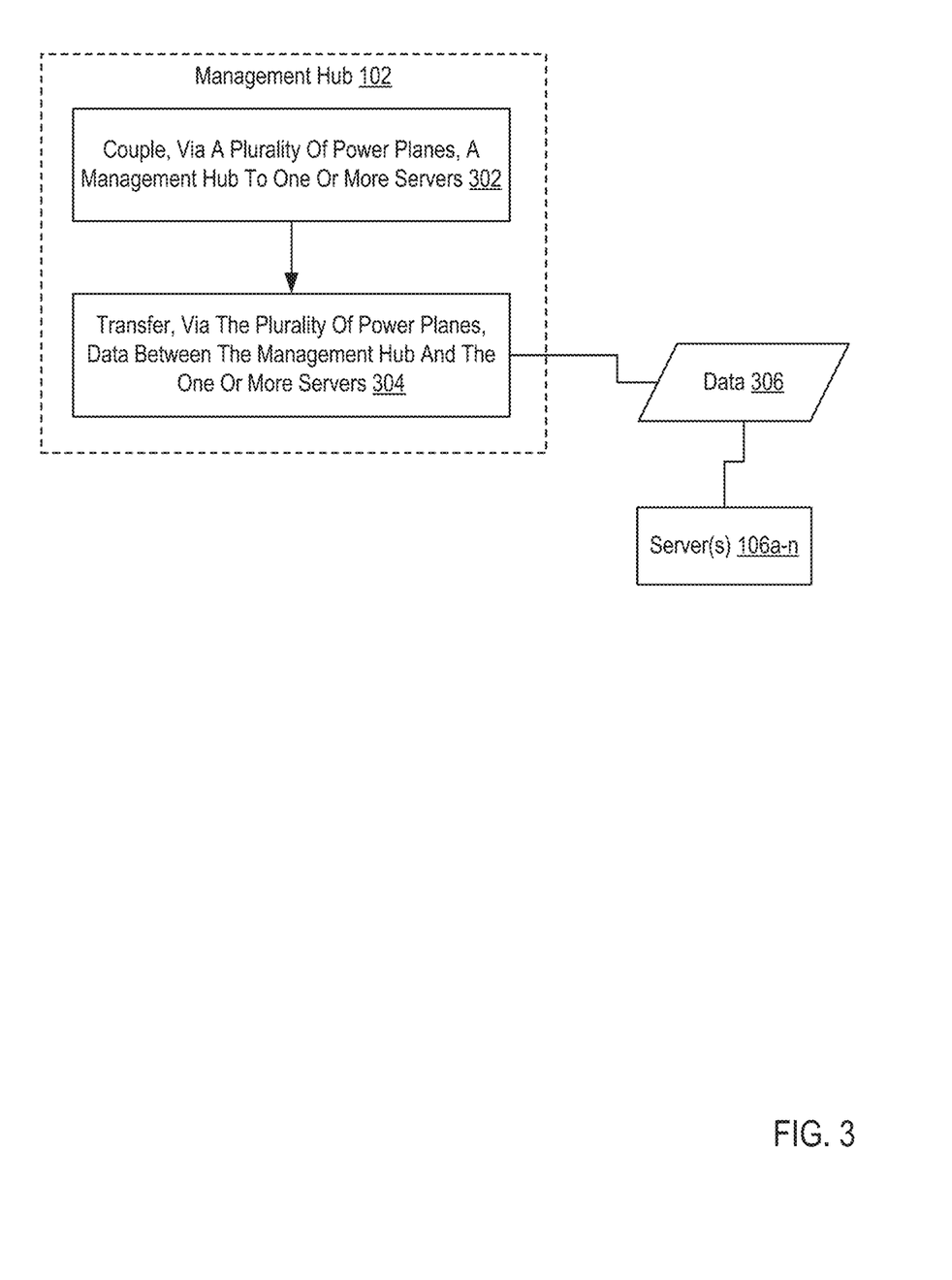
FIG. 3 is a flowchart of an example method for data center management over a power plane according to some embodiments of the present disclosure.

For further explanation, FIG. 3 sets forth a flow chart illustrating an exemplary method for data center management over a power plane according to embodiments of the present invention that includes coupling 302 (e.g., by a management hub 102), via a plurality power planes 110a/b, a management hub 102 to one or more servers 106a-n. Coupling 302 the management hub 102 to one or more servers 106a-n includes establishing, for the management hub 102 and servers 106a-n, a physical connection to a plurality of power planes 110a/b capable of delivering power from a power source to power supplies of the management hub 102 and servers 106a-n. For example, a given power plane 110a may connect a single power supply 104a of the management hub 102 and single power supplies 108a/c of servers 106a-n to a power source. Additional power planes may be used to connect additional power supplies of the management hub 102 and servers 106a-n to external power sources.

The method of FIG. 3 also includes transferring 304 (e.g., by a management hub 102, via a management module 214 of the management hub 102), via the plurality of power planes 110a/b, data 306 between the management hub 102 and the one or more servers 106a-n. The data 306 may include management data (e.g., out-of-band management data) such as KVM traffic or BMC traffic. The data 306 may also include data selected for transfer via the power plane 110a/b in response to a size of the data falling below a threshold. Transferring 304 the data 306 may include encoding, by the management hub 102, the data for transmission via the power plane 110a/b for receipt by a server of the one or more servers 106a-n and transmitting the data 306 via the power plane 110a/b. Transferring 304 the data 306 may also include receiving, by the management hub 102, a signal from a server of the one or more servers 106a-n via the power plane(s) 110a/b and decoding the signal into the data 306.

Figure 4:
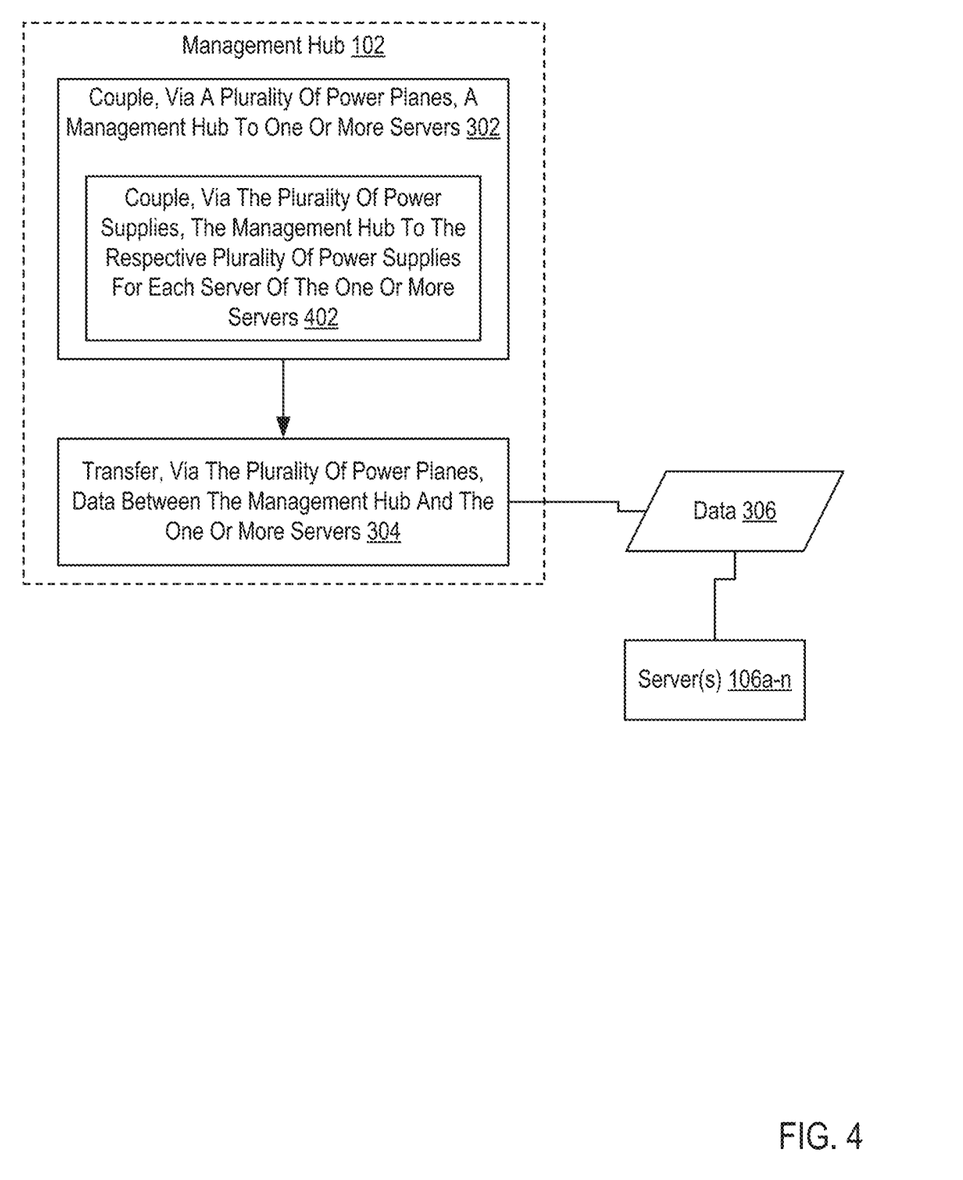
FIG. 4 is a flowchart of an example method for data center management over a power plane according to some embodiments of the present disclosure.

For further explanation, FIG. 4 sets forth a flow chart illustrating an exemplary method for data center management over a power plane according to embodiments of the present invention that includes coupling 302 (e.g., by a management hub 102), via a plurality of power planes 110a/b, a management hub 102 to one or more servers 106a-n; and transferring 304, via the plurality of power planes 110a/b, data between the management hub 102 and the one or more servers 106a-n.

The method of FIG. 4 differs from FIG. 3 in that coupling 302, via a plurality of power plane s110a/b, the management hub 102 to one or more servers 106a-n comprises coupling 402, via the plurality of power planes 110a/b, the management hub 102 to the respective power supplies for each server of the one or more servers 106a-n. For example, the management hub 102 and servers 106a-n may be coupled using a number of power planes equal to a number of power supplies in the management hub 102 and servers 106a-n. Using this example, where the management hub 102 and servers 106a-n each have one power supply, the management hub 102 and servers 106a-n would be connected using a single power plane. Where the management hub 102 and servers 106a-n each have four power supplies, the management hub 102 and servers 106a-n would be connected using four power planes providing four redundant links, etc. In other words, the management hub 102 is coupled to each server 106a-n through a plurality of links through a plurality of power planes 110a/b.

Figure 5:
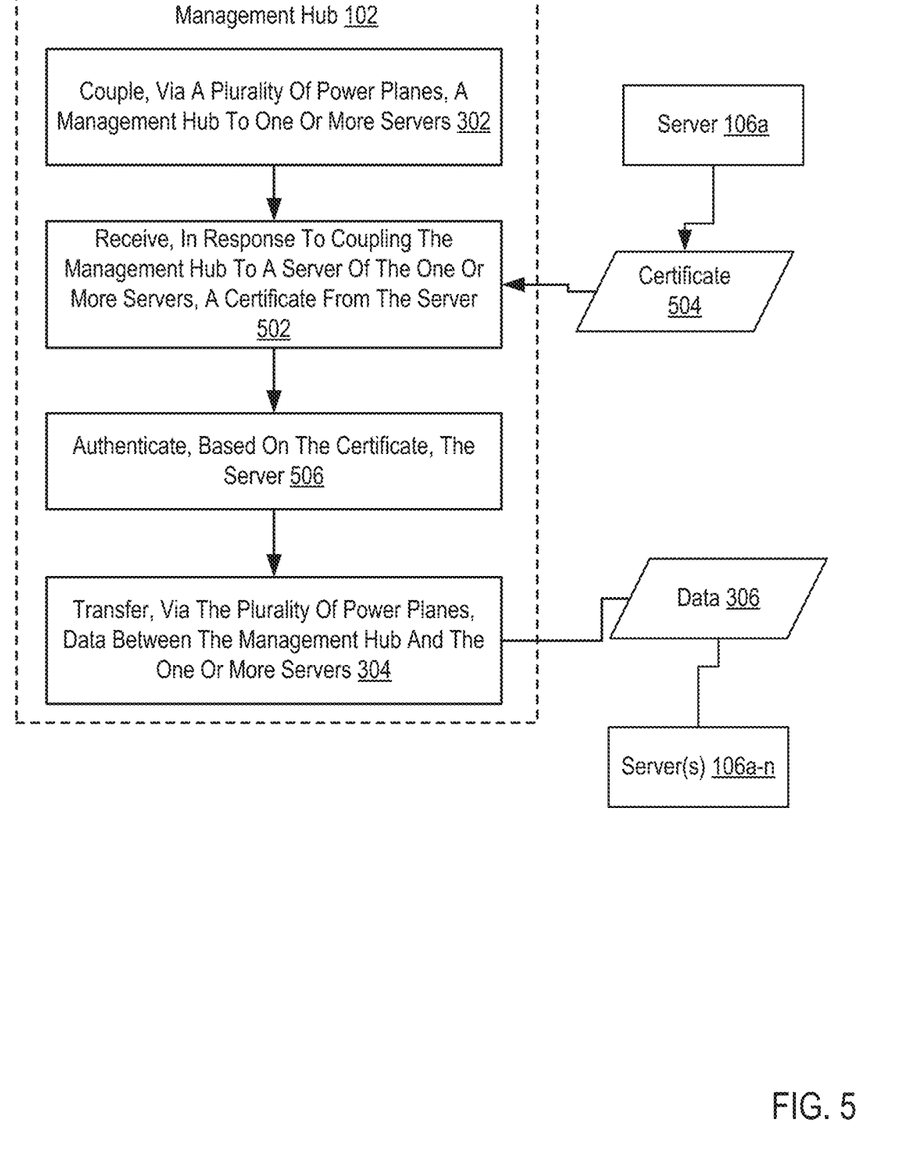
FIG. 5 is a flowchart of an example method for data center management over a power plane according to some embodiments of the present disclosure.

For further explanation, FIG. 5 sets forth a flow chart illustrating an exemplary method for data center management over a power plane according to embodiments of the present invention that includes coupling 302 (e.g., by a management hub 102), via a plurality of power planes 110a/b, a management hub 102 to one or more servers 106a-n; and transferring 304, via the plurality of power planes 110a/b, data between the management hub 102 and the one or more servers 106a-n.

The method of FIG. 5 differs from FIG. 3 in that the method of FIG. 5 also includes receiving 502, in response to coupling the management hub 102 to a server 106 of the one or more servers 106a-n, a certificate 504 from the server 106a. For example, in response to a physical connection to the power plane 110a/b by the management hub 102 and server 106a, thereby coupling the management hub 102 and server 106a, the server 106a sends a certificate 504 via the power plane 110a/b to the management hub. Each power supply 108a/b of the server 106a may correspond to a different certificate 504. The certificate 504 for each power supply 108a/b may be defined by a user or client input to the server 106a.

The method of FIG. 5 also includes authenticating 506 (e.g., by the management hub 102, by a management module 214 of the management hub 102), based on the certificate 504, the server 106a. For example, the management hub 102 may communicate with a third-party certificate authority to determine if the certificate 504 is authentic. The management hub 102 may also determine if the certificate 504 is signed using a valid key (e.g., a private key of the server 106a corresponding to a public key of the management hub 102, etc.). The management hub 102 may also determine if one or more credentials included in the certificate 504 or accompanying the certificate 504 are valid (e.g., usernames, passwords, tokens, etc.). The management hub 102 may then encrypt data 306 transmitted to the server using the certificate 504, or decrypt data 306 received from the server 106a using the certificate 504. Thus, unauthorized devices coupled to the management hub 102 via the power plane 110a/b will be unable to receive data intended for receipt by other devices, and cannot inject data into the power plane 110a/b for receipt by other devices. Moreover, authorized devices (e.g., other servers) cannot decrypt data sent via the power plane 110a/b intended for other devices.

Figure 6:
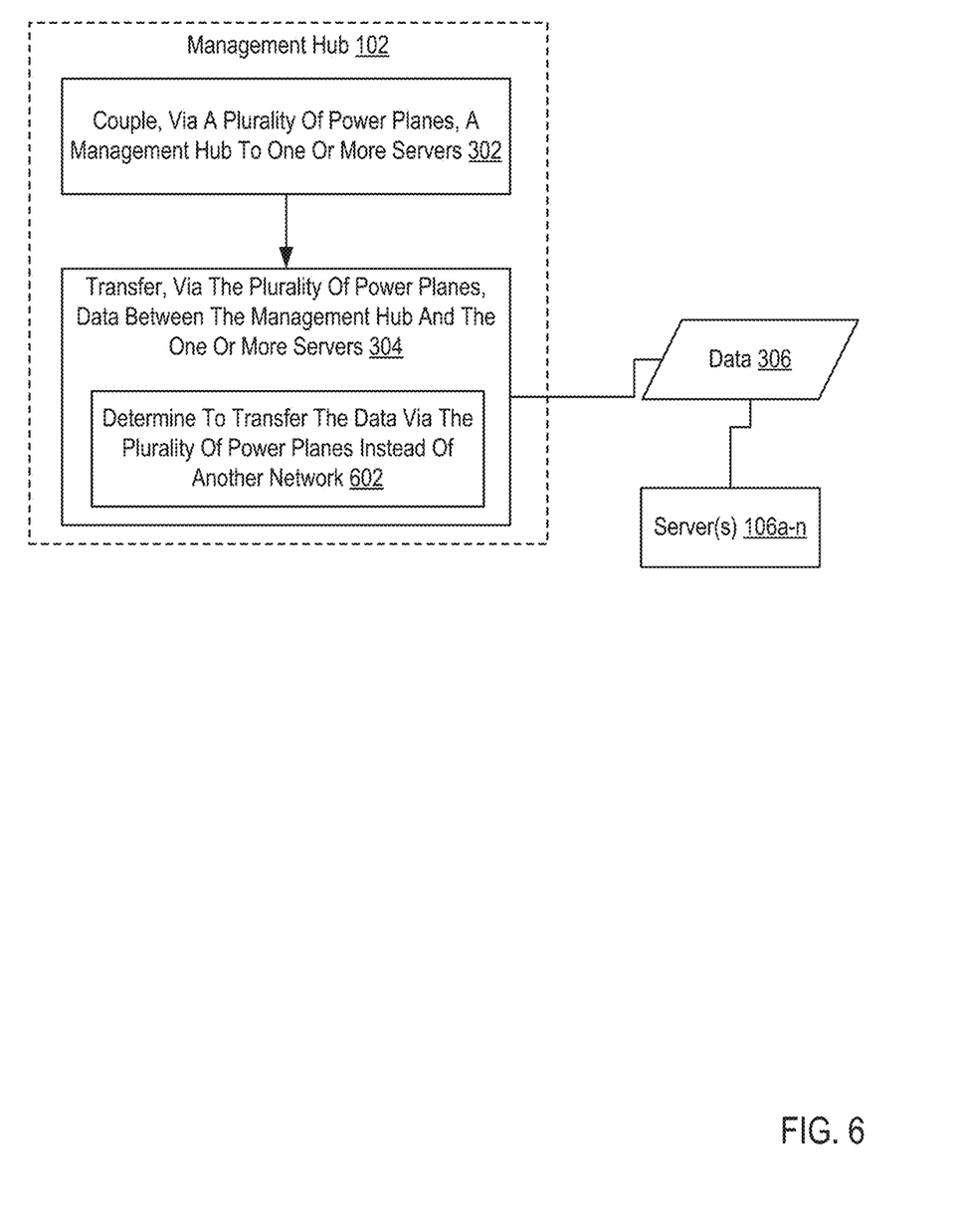
FIG. 6 is a flowchart of an example method for data center management over a power plane according to some embodiments of the present disclosure.

For further explanation, FIG. 6 sets forth a flow chart illustrating an exemplary method for data center management over a power plane according to embodiments of the present invention that includes coupling 302 (e.g., by a management hub 102), via a plurality of power planes 110a/b, a management hub 102 to one or more servers 106a-n; and transferring 304, via the plurality of power planes 110a/b, data between the management hub 102 and the one or more servers 106a-n.

The method of FIG. 6 differs from FIG. 3 in that transferring 304, via the plurality of power planes 110a/b, data 306 between the management hub 102 and the one or more servers 106a-n includes determining 602 (e.g., by the management hub 102, by a management module 214 of the management hub 102) to transfer the data 306 via the plurality of power planes 110a/b instead of another network (e.g., a network 103). Determining 602 to send the data 306 via the plurality of power planes 110a/b may be based on a type of data. For example, out-of-band management data may be determined 602 to be sent via the power planes 110a/b, whereas other in-band data may be determined to be sent via the network 103. Determining 602 to send the data 306 via the power planes 110a/b may be based on a data size or required bandwidth. For example, data 306 falling below a size or bandwidth threshold may be determined to be sent via the power plane 110a/b while data meeting or exceeding the threshold may be determined to be sent via the network 103. Other criteria may also be used in determining 306 whether to send the data via the power planes 110*a/b* or the network 103.

In view of the explanations set forth above, readers will recognize that the benefits of data center management over a power plane according to embodiments of the present invention include:

Improved performance of a computing system by allowing for management data and other low-bandwidth data to be transferred to and from servers without dedicated cabling or devices, improving cable management and airflow in a data center rack.

Improved performance of a computing system by providing for data transfer over power cabling with authentication and authorization of connected devices.

Exemplary embodiments of the present invention are described largely in the context of a fully functional computer system for data center management over a power plane. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of data center management over a power plane, the method comprising:
    coupling, via a plurality of power planes, a management hub to a server; and
    transferring, via the plurality of power planes, data between the management hub and the server.

2. The method of claim 1, wherein the server comprises a plurality of power supplies, wherein coupling the management hub to the server comprises coupling, via the plurality of power planes, the management hub to the plurality of power supplies of the server, and wherein the power planes are configured to deliver power to the plurality of power supplies.

3. The method of claim 1, further comprising:
    receiving, by the management hub, in response to coupling the management hub to the server, a certificate from the server; and
    authenticating, based on the certificate, the server.

4. The method of claim 3, wherein the certificate is one of a plurality of certificates for the server, each certificate corresponding to a power supply of a plurality of power supplies for the server.

5. The method of claim 3, further comprising encrypting, based on the certificate, a portion of the data for transfer to the server.

6. The method of claim 1, wherein transferring the data between the management hub and the server comprises determining to transfer the data via the plurality of power planes instead of via another network, and wherein transferring, via the plurality of power planes, the data between the management hub and the server includes transferring the data to a power supply included within the server.

7. The method of claim 6, wherein determining to transfer the data via the plurality of power planes is based on a type of data or a size of data.

8. The method of claim 1, wherein transferring, via the plurality of power planes, data between the management hub and the server comprises:
    transferring the data via a first power plane of the plurality of power planes; and
    wherein one or more second power planes of the plurality of power planes are redundant links.

9. An apparatus for data center management over a power plane, the apparatus comprising a computer processor, a computer memory operatively coupled to the computer processor, the computer memory having disposed within it computer program instructions that, when executed by the computer processor, cause the apparatus to carry out the steps of:
    coupling, via a plurality of power planes, a management hub to a server; and
    transferring, via the plurality of power planes, data between the management hub and the server.

10. The apparatus of claim 9, wherein the server comprises a plurality of power supplies, wherein coupling the management hub to the server comprises coupling, via the plurality of power planes, the management hub to the plurality of power supplies for the server, and wherein the power planes are configured to deliver power to the plurality of power supplies.

11. The apparatus of claim 9, wherein the steps further comprise:
    receiving, by the management hub, in response to coupling the management hub to the server, a certificate from the server; and
    authenticating, based on the certificate, the server.

12. The apparatus of claim 11, wherein the certificate is one of a plurality of certificates for the server, each certificate corresponding to a power supply of a plurality of power supplies for the server.

13. The apparatus of claim 11, wherein the steps further comprise encrypting, based on the certificate, a portion of the data for transfer to the server.

14. The apparatus of claim 9, wherein transferring the data between the management hub and the server comprises determining to transfer the data via the plurality of power planes instead of via another network.

15. The apparatus of claim 14, wherein determining to transfer the data via the plurality of power planes is based on a type of data or a size of data.

16. The apparatus of claim 9, wherein transferring, via the plurality of power planes, data between the management hub and the server comprises:
    transferring the data via a first power plane of the plurality of power planes; and
    wherein one or more second power planes of the plurality of power planes are redundant links.

17. A system for data center management over a power plane, comprising:
    a server;
    a management hub coupled to the server via a plurality of power planes, the management hub configured to transfer, via the plurality of power planes, data between the management hub and the server.

18. The system of claim 17, wherein the server comprises a plurality of power supplies, wherein the management hub is coupled, via the plurality of power planes, to the plurality of power supplies of the server, and wherein the power planes are configured to deliver power to the plurality of power supplies.

19. The system of claim 17, wherein the management hub is further configured to:
   receive, in response to coupling the management hub to the server, a certificate from the server; and
   authenticate, based on the certificate, the server.

20. The system of claim 19, wherein the certificate is one of a plurality of certificates for the server, each certificate corresponding to a power supply of a plurality of power supplies for the server.

* * * * *